US012706033B1

(12) United States Patent
Chien

(10) Patent No.: US 12,706,033 B1
(45) Date of Patent: Aug. 11, 2026

(54) MICRO LED DISPLAYING APPARATUS HAVING DAMAGED IMPACT AREA BUT REMAINING AREA CAN STILL OPERATE NORMALLY

(71) Applicant: PowerView Display Corporation, Hsinchu County (TW)

(72) Inventor: Cheng-Pang Chien, Hsinchu County (TW)

(73) Assignee: POWERVIEW DISPLAY CORPORATION, Hsinchu County (TW)

( * ) Notice: Subject to any disclaimer, the term of this patent is extended or adjusted under 35 U.S.C. 154(b) by 0 days.

(21) Appl. No.: 19/258,954

(22) Filed: Jul. 3, 2025

(51) Int. Cl.
*G09G 3/32* (2016.01)

(52) U.S. Cl.
CPC ....... *G09G 3/32* (2013.01); *G09G 2300/0426* (2013.01); *G09G 2330/08* (2013.01); *G09G 2380/02* (2013.01)

(58) Field of Classification Search
CPC ............. G09G 3/32; G09G 2300/0426; G09G 2330/08; G09G 2380/02
See application file for complete search history.

(56) References Cited

U.S. PATENT DOCUMENTS

| | | | | |
|---|---|---|---|---|
| 6,970,274 B2 * | 11/2005 | Morita | G09G 3/3648 | 345/206 |
| 2007/0085805 A1 * | 4/2007 | Ishii | G09G 3/3655 | 345/98 |
| 2016/0253969 A1 * | 9/2016 | Chen | G09G 3/03 | 345/214 |
| 2017/0090630 A1 * | 3/2017 | Kim | G06F 3/0443 | |
| 2024/0194138 A1 * | 6/2024 | Kim | G09G 3/3233 | |
| 2025/0118265 A1 * | 4/2025 | Lee | G09G 3/3233 | |
| 2025/0118267 A1 * | 4/2025 | Sang | G09G 3/3291 | |
| 2025/0182700 A1 * | 6/2025 | Park | G09G 3/3233 | |
| 2025/0218335 A1 * | 7/2025 | Park | G09G 3/2092 | |
| 2025/0273173 A1 * | 8/2025 | Kim | G09G 3/3275 | |
| 2025/0391338 A1 * | 12/2025 | Yu | G09G 3/32 | |

FOREIGN PATENT DOCUMENTS

| | | | |
|---|---|---|---|
| KR | 102601613 B1 * | 11/2023 | G09G 3/20 |

* cited by examiner

*Primary Examiner* — Rodney Amadiz
(74) *Attorney, Agent, or Firm* — WPAT, PC

(57) ABSTRACT

A micro LED displaying apparatus is provided. When the micro LED displaying apparatus is damaged by external forces, the circuits corresponding to the impact area are damaged and unable to display images normally. However, according to the technologies of the present invention, the remaining area can still display images normally. That is, even if the micro LED displaying apparatus is damaged by external forces, a large area of the micro LED displaying apparatus of the present invention can still display images normally. Consequently, the micro LED displaying apparatus of the present invention is suitable for specified fields with strict verification standards.

12 Claims, 6 Drawing Sheets

MICRO LED DISPLAYING APPARATUS HAVING DAMAGED IMPACT AREA BUT REMAINING AREA CAN STILL OPERATE NORMALLY

FIELD OF THE INVENTION

The present invention relates to a displaying apparatus, and more particularly to a micro LED displaying apparatus.

BACKGROUND OF THE INVENTION

Generally, an LCD displaying apparatus includes an LCD panel and a control circuit. FIG. 1A is a schematic cross-sectional view illustrating the structure of a conventional LCD panel. The LCD panel 100 includes a lower substrate 130, a liquid crystal layer 120 and an upper substrate 110. The liquid crystal layer 120 is sealed between the upper substrate 110 and the lower substrate 130 by a sealing material 122.

A color filter is attached on a glass substrate to form a color filtering substrate, which is used as the upper substrate 110 of the LCD panel. Furthermore, a thin film transistor array (TFT-array) is fabricated on a glass substrate to form a thin film transistor array substrate (TFT-array substrate), which is used as the lower substrate 130 of the LCD panel.

The LCD displaying apparatus also includes a backlight module (not shown). The backlight module is located under the lower substrate 130 and used as a light source. In other words, the light beam from the backlight module enters the lower substrate 130 of the LCD panel 100 and exits from the upper substrate 110 of the LCD panel 100.

When a control circuit provides a voltage to the thin film transistor array on the lower substrate 130, the liquid crystals in the liquid crystal layer 120 are oriented from one direction to another direction. By controlling the intensity of light beams passing through the liquid crystal layer 120 and irradiating on the color filter on the upper substrate 110, all pixels present different colors and display an image.

FIG. 1B is a schematic diagram illustrating a thin film transistor array and related circuits in the lower substrate according to a conventional technology. As shown in FIG. 1B, the thin film transistor array of the lower substrate 130 is fabricated on a glass substrate 138. The thin film transistor array is composed of M×N thin film cells, in which M and N are any positive integers. For example, as shown in FIG. 1B, the thin film transistor array is composed of 6×5 thin film cells, and all thin film cells have the same structure.

For example, the thin film cell 135 includes a thin film transistor 131 and an indium tin oxide film (ITO film) 132. The gate terminal of the thin film transistor 131 is served as a first terminal of the thin film cell 135. The first terminal of the thin film cell 135 is connected to a gate line $G_1$. The first drain/source terminal of the thin film transistor 131 is served as a second terminal of the thin film cell 135. The second terminal of the thin film cell 135 is connected to a data line $D_5$. The second drain/source terminal of the thin film transistor 131 is connected to the indium tin oxide film 132.

In the thin film transistor array, the first terminals of the five thin film cells in the first row are connected to the same gate line $G_1$, and the second terminals of the five thin film cells in the first row are respectively connected to the data lines $D_1$~$D_5$. The first terminals of the five thin film cells in the second row are connected to the same gate line $G_2$, and the second terminals of the five thin film cells in the second row are respectively connected to the data lines $D_1$~$D_5$. The rest may be deduced by analogy. Similarly, the first terminals of the five thin film cells in the sixth row are connected to the same gate line $G_6$, and the second terminals of the five thin film cells in the sixth row are respectively connected to the data lines $D_1$~$D_5$. In addition, a gate driver 220 is connected to the gate lines $G_1$-$G_6$, a source driver 230 is connected to the data lines $D_1$~$D_5$, and a timing controller 240 is connected to the gate driver 220 and the source driver 230. The timing controller 240, the source driver 230 and the gate driver 220 are all control circuits of the LCD displaying apparatus.

During the normal operations, the timing controller 240 controls the gate driver 220 to sequentially generate pulses to the corresponding gate lines $G_1$~$G_6$, and the timing controller 240 controls the source driver 230 to generate display data to the data lines $D_1$~$D_5$.

For example, when the gate driver 220 generates a pulse to the gate line $G_1$ and the source driver 230 generates five display data to the data lines $D_1$~$D_5$, the thin film transistors of the five thin film cells in the first row are turned on, and the five display data of the data lines $D_1$~$D_5$ are respectively transmitted to the indium tin oxide films of the five thin film cells in the first row. Similarly, when the gate driver 220 generates a pulse to the gate line $G_2$ and the source driver 230 generates five display data to the data lines $D_1$~$D_5$, the thin film transistors of the five thin film cells in the second row are turned on, and the five display data of the data lines $D_1$~$D_5$ are respectively transmitted to the indium tin oxide films of the five thin film cells in the second row. The rest may be deduced by analogy.

In addition, the thin film cells in the array structure can control the orientation angles of the liquid crystals in the liquid crystal layer 120 according to the display data received by the indium tin oxide films, and thus the brightness of the light beam will be correspondingly controlled. Consequently, the image can be displayed on the upper substrate. The display data received by the indium tin oxide film represents the voltage received by the indium tin oxide film. In addition, the orientation angles of the liquid crystals can be controlled according to the display data.

In FIG. 1B, the thin film transistor array is fabricated on the glass substrate 138. For example, the thin film transistor array is formed within a display area 150 indicated by the dotted lines. The gate driver 220 is fabricated outside the display area 150 of the glass substrate 138. In addition, the gate driver 220 is connected to the gate lines $G_1$~$G_6$. Consequently, the viewer is able to see the image displayed in the display area 150 only but is unable to see the gate driver 220 outside the display area 150. In addition, the source driver 230 is disposed outside the glass substrate 138, and the source driver 230 is connected to the data lines $D_1$~$D_5$ through a flexible flat cable (not shown).

Alternatively, the gate driver 220 is disposed outside the glass substrate 138 and connected to the gate lines $G_1$~$G_6$ on the glass substrate 138 through a flexible flat cable (not shown).

FIGS. 2A and 2B are schematic diagrams illustrating a thin film transistor array and related circuits in the lower substrate according to other conventional technologies.

Please refer to FIG. 2A. In the lower substrate 130, the gate driver 220 and the source driver 230 are disposed outside the glass substrate 168. Consequently, the entire glass substrate is almost the display area 160. The film transistor array (not shown) is fabricated in the display area 150 of the glass substrate 168, which is indicated by dotted lines. The gate driver 220 is connected to all gate lines (not shown) through a flexible flat cable 225. The source driver 230 is connected to all data lines (not shown) through a flexible flat cable 235. Furthermore, the timing controller 240 is connected to the gate driver 220 and the source driver 230 to control the operations of the gate driver 220 and the source driver 230.

Please refer FIG. 2B. In case that the LCD panel is a large-sized LCD panel, the gate lines (not shown) are very long. Due to the influence of the gate line resistance, the pulse transmitted to the terminal of the gate line may decay, and thus the thin film cell connected to the terminal of the gate line cannot be operated normally. For solving this drawback, the large-sized LCD panel can be provided with two gate drivers 220 and 221. The gate driver 220 is connected to all gate lines through a flexible flat cable 225, and the gate driver 221 is connected to all gate lines through a flexible flat cable 226. Furthermore, the two gate drivers 220 and 221 and the source driver 230 are connected to the timing controller 240.

In the LCD panel of FIG. 2B, each of the two gate drivers 220 and 221 will generate a pulse to the first terminal and the second terminal of the same gate line at the same time. Since each of the two terminals of the gate line receives a pulse at the same time, the problem of pulse decay on the gate line can be overcome.

FIG. 3 schematically illustrates a conventional LCD displaying apparatus that is damaged by external forces. When the LCD displaying apparatus is damaged by the external force, the glass substrate in an impact area 300 is broken. Due to the liquid crystal leakage, a large area of the LCD displaying apparatus will be unable to display images normally.

In addition to the liquid crystal leakage, other drawbacks occur. Since the upper substrate 110 and the lower substrate 130 of the LCD panel are both made of glass, if the lower substrate 130 corresponding to the impact area 300 is also broken, the cracks on the glass substrate will directly cause the wires in the thin film transistor array to break. When the gate lines $G_1$~$G_6$ or the data lines $D_1$~$D_5$ are broken, the thin film cells in the thin film transistor array cannot be operated normally, and a large area of the LCD displaying apparatus cannot display images normally.

For specified fields with strict verification standards (e.g., the military field or the aviation field), using conventional LCD displaying apparatuses to display images will suffer from a high risk. For example, if the LCD displaying apparatus in the radar station is damaged by external forces, the viewer will be unable to view the correct position of the detected object on the LCD displaying apparatus. Similarly, if the LCD displaying apparatus in the cockpit of an aircraft is damaged by external forces, the pilot will be unable to view the operations of the aircraft through the LCD displaying apparatus, which will cause unexpected risks.

In recent years, micro LED displaying apparatuses have been commercialized and can be used in various electronic devices. Since liquid crystals are not used in the micro LED displaying apparatuses, the liquid crystal leakage problem can be avoided. However, when a micro LED displaying apparatus is damaged by external forces, the glass substrate may be broken, and a large area of the micro LED displaying apparatus cannot display images normally.

SUMMARY OF THE INVENTION

An embodiment of the present invention provides a micro LED displaying apparatus. The micro LED displaying apparatus includes a flexible substrate, an LED cell array, a first gate driver, a second gate driver, a first source driver, a second source driver and a timing controller. The LED cell array is fabricated on the flexible substrate. The LED cell array is composed of M×N LED cells, wherein M and N are positive integers. The LED cell array is connected to M gate lines and N data lines. The first terminals of the N LED cells in a first row of the LED cell array are connected to a first gate line of the M gate lines. The second terminals of the N LED cells in the first row of the LED cell array are respectively connected to the N data lines. The first gate driver is connected to the first terminals of the M gate lines. The second gate driver is connected to the second terminals of the M gate lines. The first source driver is connected to the first terminals of the N data lines. The second source driver is connected to the second terminals of the N data lines. The timing controller is connected to the first gate driver, the second gate driver, the first source driver and the second source driver. The first gate driver and the second gate driver simultaneously and respectively generate a first pulse and a second pulse. The first source driver and the second source driver simultaneously and respectively generate a first display data and a second display data. The first pulse from the first gate driver is transmitted to a first terminal of the first gate line. The second pulse from the second gate driver is transmitted to a second terminal of the first gate line. The first display data from the first source driver is transmitted to a first terminal of a first data line of the N data lines. The second display data from the second source driver is transmitted to a second terminal of the first data line. The first display data and the second display data are identical.

Another embodiment of the present invention provides a micro LED displaying apparatus. The micro LED displaying apparatus includes a flexible substrate, an LED cell array, a first gate driver, a second gate driver, a first source driver, a second source driver and a timing controller. The LED cell array is fabricated on the flexible substrate. The LED cell array is composed of M×N LED cells, wherein M and N are positive integers. The LED cell array is connected to M gate lines and N data lines. The first terminals of the N LED cells in a first row of the LED cell array are connected to a first gate line of the M gate lines. The second terminals of the N LED cells in the first row of the LED cell array are respectively connected to the N data lines. The first gate driver is connected to the first terminals of the M gate lines. The second gate driver is connected to the second terminals of the M gate lines. The first source driver is connected to the first terminals of the N data lines. The second source driver is connected to the second terminals of the N data lines. The timing controller is connected to the first gate driver, the second gate driver, the first source driver and the second source driver. The second gate driver and the second source driver receive an enable signal. When the enable signal is inactivated, the second gate driver and the second source driver are disabled, the first pulse from the first gate driver is transmitted to a first terminal of the first gate line, and the first display data from the first source driver is transmitted to a first terminal of a first data line of the N data lines.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a micro LED displaying apparatus. When the micro LED displaying apparatus is damaged by external forces, the circuits corresponding to the impact area are damaged and unable to display images normally. However, according to the technologies of the present invention, the remaining area can still display images normally. That is, even if the micro LED displaying apparatus is damaged by external forces, a large area of the micro LED displaying apparatus of the present invention can still display images normally. Consequently, the micro LED displaying apparatus of the present invention is suitable for specified fields with strict verification standards.

Figure 1A:
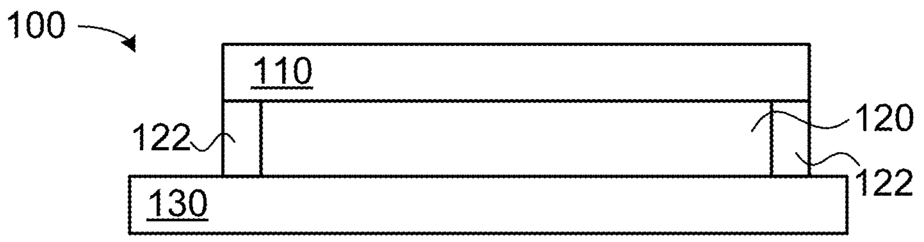
FIG. 1A (PRIOR ART)
FIG. 1A (prior art) is a schematic cross-sectional view illustrating the structure of a conventional LCD panel.
Figure 1B:
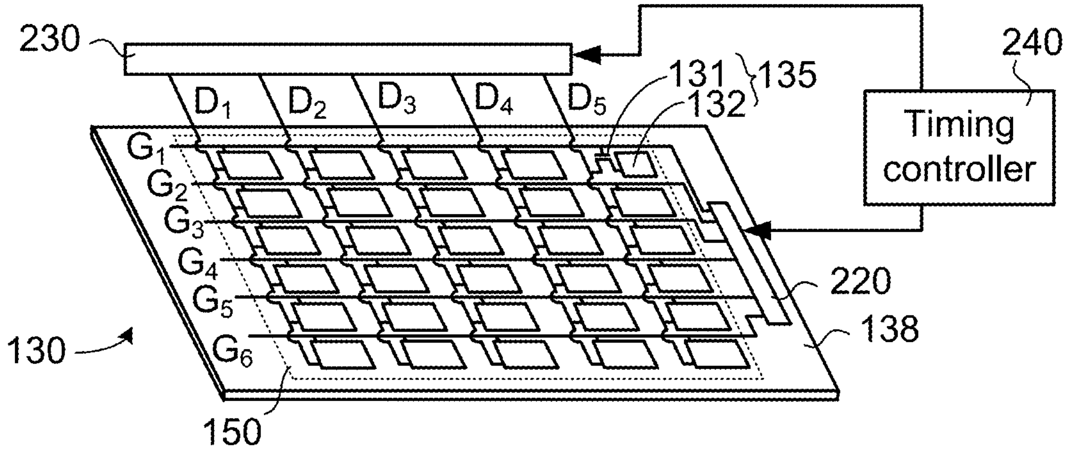
FIG. 1B (PRIOR ART)
FIG. 1B (prior art) is a schematic diagram illustrating a thin film transistor array and related circuits in the lower substrate according to an conventional technology.
Figure 2A:
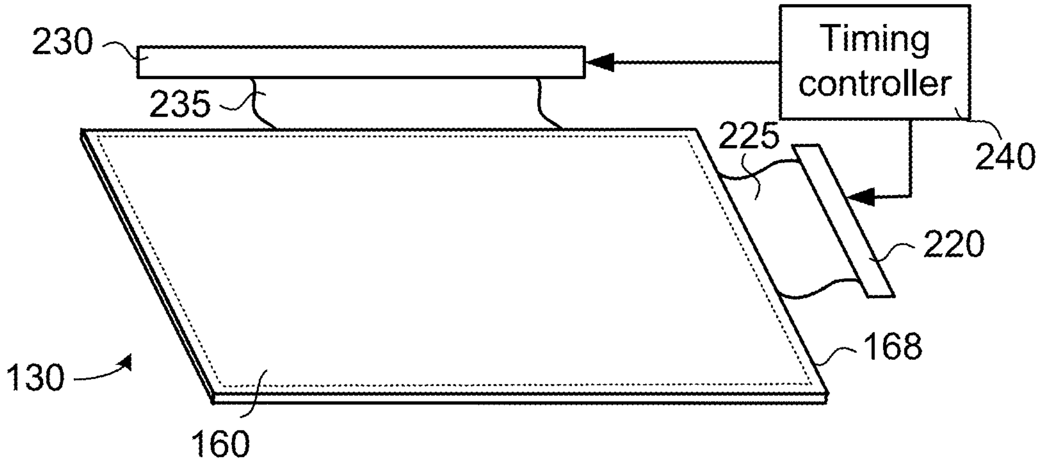
FIG. 2A (PRIOR ART)
FIGS. 2A and 2B (prior art) are schematic diagrams illustrating a thin film transistor array and related circuits in the lower substrate according to other conventional technologies.
Figure 2B:
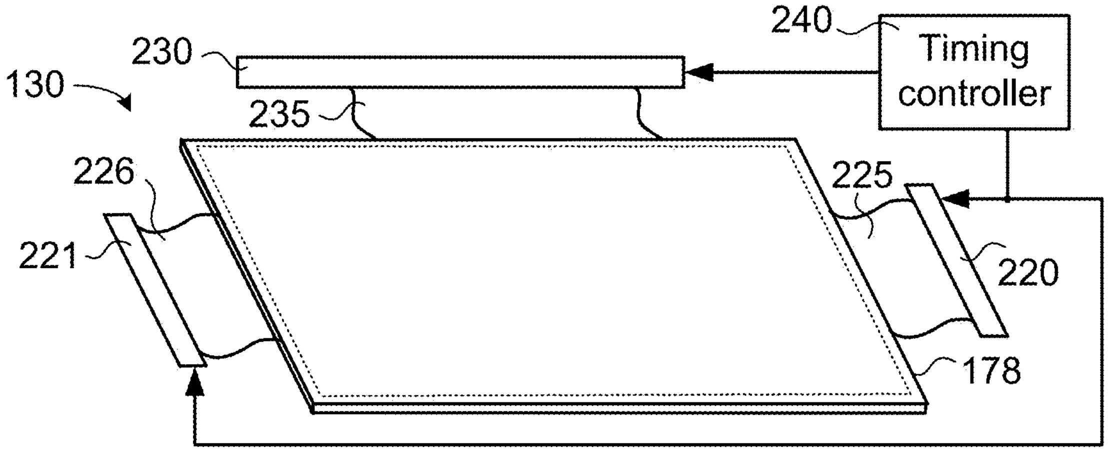
FIG. 2B (PRIOR ART)
Figure 3:
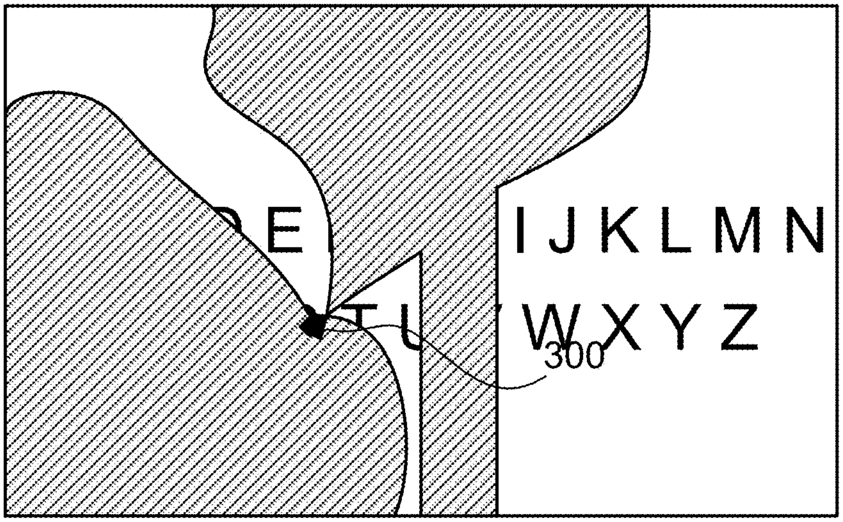
FIG. 3 (PRIOR ART)
FIG. 3 (prior art) schematically illustrates a conventional LCD displaying apparatus that is damaged by external forces.
Figure 4A:
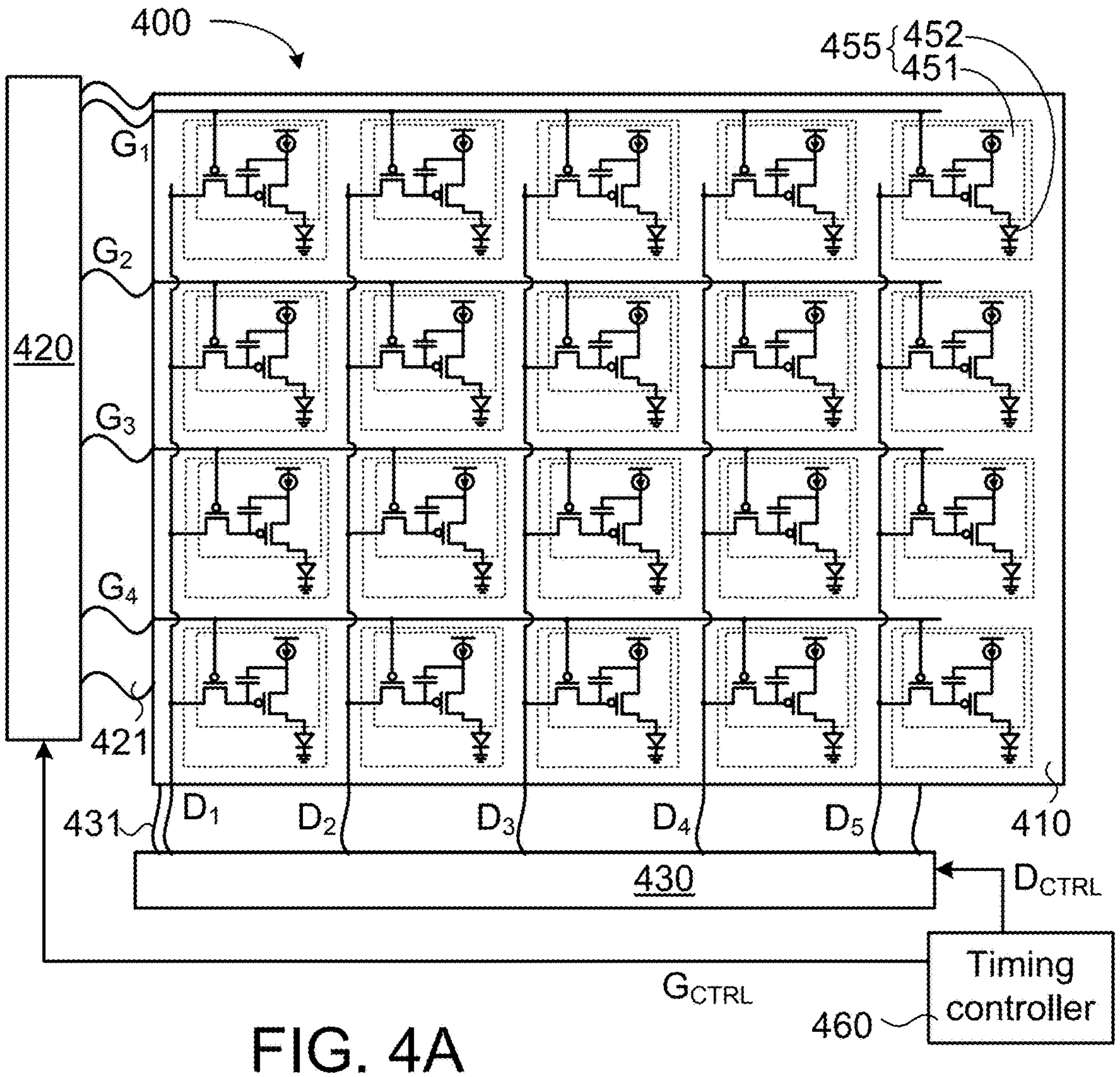
FIG. 4A is a schematic circuit diagram of a micro LED displaying apparatus according to a first embodiment of the present invention.

FIG. 4A is a schematic circuit diagram of a micro LED displaying apparatus according to a first embodiment of the present invention. As shown in FIG. 4A, the micro LED displaying apparatus 400 includes a micro LED panel, a gate driver 420, a source driver 430 and a timing controller 460. The micro LED panel includes a flexible substrate 410 and an LED cell array. The LED cell array is fabricated on the flexible substrate 410.

As shown in FIG. 4, an LED cell array is fabricated on the flexible substrate 410. The LED cell array is composed of M×N LED cells, in which M and N are any positive integers. For example, the LED cell array is composed of 4×5 LED cells.

Take the LED cell 455 as an example. The LED cell 455 includes a driving stage 451 and a light emitting diode (LED) 452. The light emitting diode 452 can emit one of a red light beam, a green light beam and a blue light beam. The control terminal of the driving stage 451 is served as a first terminal of the LED cell 455. The first terminal of the LED cell 455 is connected to the gate line $G_1$. The data terminal of the driving stage 451 is served as a second terminal of the LED cell 455. The second terminal of the LED cell 455 is connected to the data line $D_5$. The output terminal of the driving stage 451 is connected to the anode of the light emitting diode 452. The cathode of the light emitting diode 452 receives a ground voltage.

It is noted that the actual circuit of the LED cell 455 is not restricted. That is, other LED cells can be combined to form the LED cell array. For example, in another LED cell array, the LED cell includes a driving stage and a light emitting diode (LED). The anode of the light emitting diode is connected to the data line $D_5$. The cathode of the light emitting diode is connected to the data terminal of the driving stage. The control terminal of the driving stage is connected to the gate line $G_1$.

In the LED cell array, the first terminals of the five LED cells in the first row are connected to the same gate line $G_1$, and the second terminals of the five LED cells in the first row are respectively connected to the corresponding data lines $D_1$~$D_5$. Similarly, the first terminals of the five LED cells in the second row are connected to the same gate line $G_2$, and the second terminals of the five LED cells in the second row are respectively connected to the corresponding data lines $D_1$~$D_5$. The rest may be deduced by analogy. Similarly, the first terminals of the five LED cells in the fourth row are connected to the same gate line $G_4$, and the second terminals of the five LED cells in the second row are respectively connected to the corresponding data lines $D_1$~$D_5$.

In the first embodiment, the gate driver 420 is connected to the gate lines $G_1$~$G_4$ through a flexible flat cable 421, and the source driver 430 is connected to the data lines $D_1$~$D_5$ through a flexible flat cable 431. That is, the four output terminals of the gate driver 420 are respectively connected to the gate lines $G_1$~$G_4$, and the five output terminals of the source driver 430 are respectively connected to the data lines $D_1$~$D_5$. Furthermore, the gate driver 420 and the source driver 430 are connected to the timing controller 460. The timing controller 460 issues a gate control signal $G_{CTRL}$ to control the gate driver 420. The timing controller 460 issues a data control signal $D_{CTRL}$ to control the source driver 430.

When the micro LED displaying apparatus is operated normally, the gate driver 420 sequentially generates a pulse to the corresponding gate lines $G_1$~$G_4$ according to the gate control signal $G_{CTRL}$. Furthermore, the source driver 430 generates display data to the data lines $D_1$~$D_5$ according to the data control signal $D_{CTRL}$.

For example, when the gate driver 420 generates a pulse to the gate line $G_1$ and the source driver 430 generates five display data to the data lines $D_1$~$D_5$, the driving stages of the five LED cells in the first row are turned on, and the five display data of the data lines $D_1$~$D_5$ are respectively transmitted to the light emitting diodes of the five LED cells in the first row. Similarly, when the gate driver 420 generates a pulse to the gate line $G_2$ and the source driver 430 generates five display data to the data lines $D_1$~$D_5$, the driving stages of the five LED cells in the second row are turned on, and the five display data of the data lines $D_1$~$D_5$ are respectively transmitted to the light emitting diodes of the five LED cells in the second row. The rest may be deduced by analogy. Furthermore, the light emitting diodes in the LED cells will emit light beams with specified color and intensity according to the received display data. Consequently, the micro LED displaying apparatus can display an image.

Figure 4B:
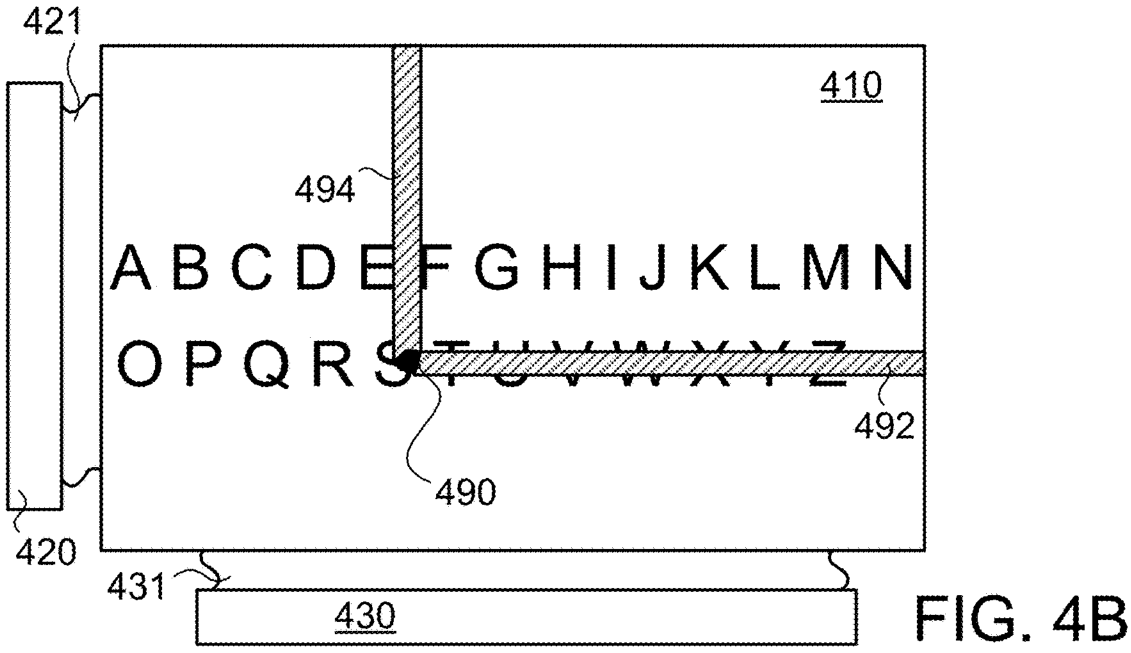
FIG. 4B schematically illustrates the micro LED displaying apparatus of the first embodiment that is damaged by external forces.

FIG. 4B schematically illustrates the micro LED displaying apparatus of the first embodiment that is damaged by external forces. When the micro LED panel of the micro LED displaying apparatus is damaged by external forces, the LED cells in the impact area 490 are damaged and unable to be operated normally. Since the LED cell array is fabricated on the flexible substrate 410 with the flexibility, the flexible substrate 410 will not have cracks. Furthermore, since the flexible substrate 410 have no cracks, only the gate lines and the data lines in the impact area 490 are broken, but the gate lines and the data lines outside the impact area 490 are not broken.

Please refer to FIG. 4B again. Since the gate line in the impact area 490 is broken, the pulse generated by the gate driver 420 cannot be transmitted to the LED cell posterior to the impact area 490. Consequently, the corresponding region 492 of the micro LED panel cannot display the image normally. Furthermore, since the data line in the impact area 490 is broken, the display data generated by the source driver 430 cannot be transmitted to the LED cell posterior to the impact area 490. Consequently, the corresponding region 494 of the micro LED panel cannot display the image normally.

In the micro LED displaying apparatus 400 of the first embodiment, the pulse generated by the gate driver 420 is transmitted from a single side (e.g., the left side) of the micro LED panel to the LED cell array, and the display data generated by the source driver 430 is transmitted from a single side (e.g., the lower side) of the micro LED panel to the LED cell array. It is noted that the micro LED displaying apparatus of the first embodiment may be further modified.

Figure 5A:
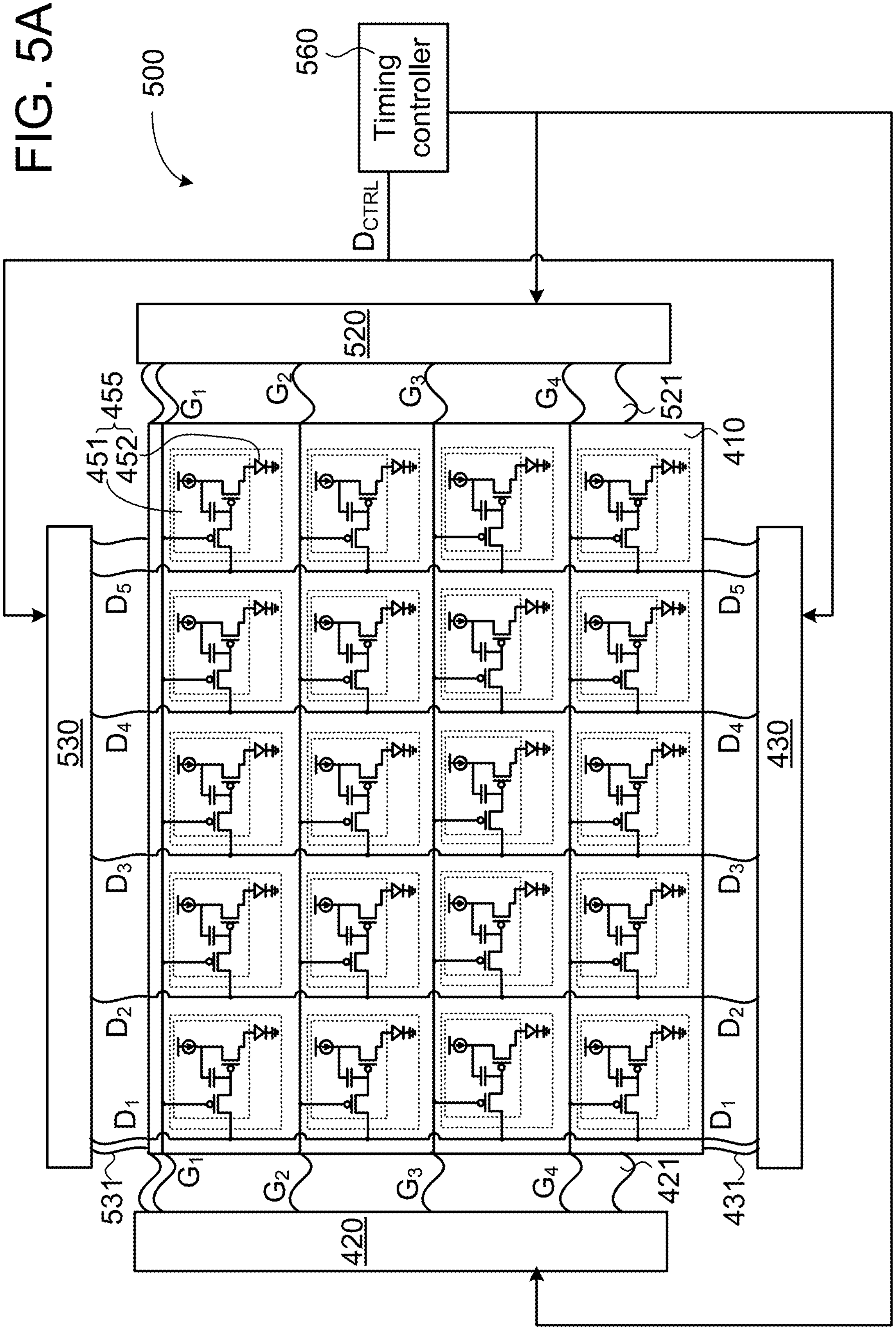
FIG. 5A is a schematic circuit diagram of a micro LED displaying apparatus according to a second embodiment of the present invention.

FIG. 5A is a schematic circuit diagram of a micro LED displaying apparatus according to a second embodiment of the present invention. In comparison with the micro LED displaying apparatus 400 of the first embodiment, the micro LED displaying apparatus 500 of this embodiment further includes an additional gate driver 520 and an additional source driver 530. In addition, a timing controller 560 is connected to the gate drivers 420, 520 and the source drivers 430, 530.

In this embodiment, the gate driver 420 is connected to the first terminals of the gate lines $G_1$~$G_4$ through the flexible flat cable 421, the gate driver 520 is connected to the second terminals of the gate lines $G_1$~$G_4$ through a flexible flat cable 521, the source driver 430 is connected to the first terminals of the data lines $D_1$~$D_5$ through the flexible flat cable 431, and the source driver 530 is connected to the second terminals of the data lines $D_1$~$D_5$ through a flexible flat cable 531. That is, the four output terminals of the gate driver 420 are respectively connected to the first terminals of the gate lines $G_1$~$G_4$, the four output terminals of the gate driver 520 are respectively connected to the second terminals of the gate lines $G_1$~$G_4$, the five output terminals of the source driver 430 are respectively connected to the first terminals of the data lines $D_1$~$D_5$, and the five output terminals of the source driver 530 are respectively connected to the second terminals of the data lines $D_1$~$D_5$.

Furthermore, the timing controller 560 issues the gate control signal $G_{CTRL}$ to control the gate driver 420 and the gate driver 520. The gate driver 420 and the gate driver 520 can simultaneously generate pulses to the first terminal and the second terminal of the same gate line. Similarly, the timing controller 560 issues the data control signal $D_{CTRL}$ to control the source driver 430 and the source driver 530. Consequently, the source driver 430 and the source driver 530 simultaneously generate the same display data to the first terminal and the second terminal of the same source line.

For example, in the micro LED displaying apparatus of the second embodiment, the pulse generated by the gate driver 420 is transmitted from a first side (e.g., the left side) of the micro LED panel to the first terminal of the gate line $G_1$ in the LED cell array. At the same time, the pulse generated by the gate driver 520 is transmitted from a second side (e.g., the right side) of the micro LED panel to the second terminal of the gate line $G_1$ in the LED cell array. Furthermore, the five display data generated by the source driver 430 are respectively transmitted from a third side (e.g., the lower side) of the micro LED panel to the first terminals of the data lines $D_1$~$D_5$. At the same time, the five display data generated by the source driver 530 are respectively transmitted from a fourth side (e.g., the upper side) of the micro LED panel to the second terminals of the data lines $D_1$~$D_5$.

The display data transmitted from the source driver 430 to the first terminal of the data line $D_1$ and the display data transmitted from the source driver 530 to the second terminal of the data line $D_1$ are identical. The display data transmitted from the source driver 430 to the first terminal of the data line $D_2$ and the display data transmitted from the source driver 530 to the second terminal of the data line $D_2$ are identical. The rest may be deduced by analogy. In other words, the light emitting diodes in the LED cell will emit light beams with specified color and intensity according to the received display data. Consequently, the micro LED displaying apparatus can display an image.

Figure 5B:
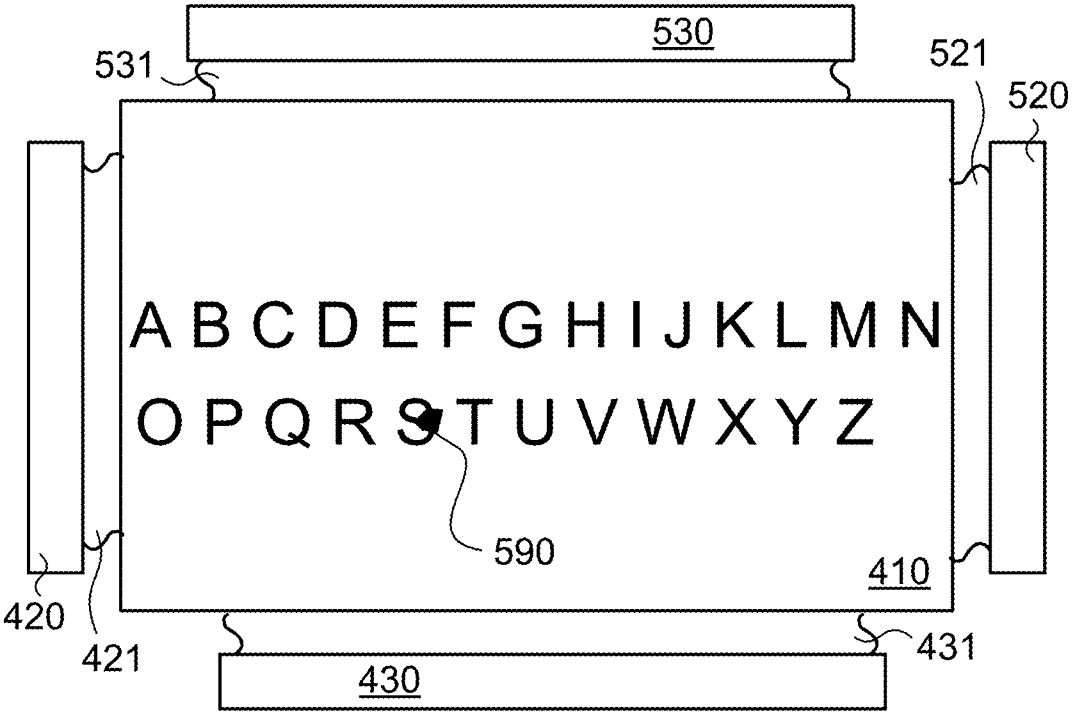
FIG. 5B schematically illustrates the micro LED displaying apparatus of the second embodiment that is damaged by external forces.

The micro LED displaying apparatus 500 of the second embodiment can be applied to specified fields with strict verification standards (e.g., the military field or the aviation field). FIG. 5B schematically illustrates the micro LED displaying apparatus of the second embodiment that is damaged by external forces.

When the micro LED panel of the micro LED displaying apparatus 500 is damaged by external forces, the LED cells in the impact area 590 are damaged and unable to be operated normally. Since the LED cell array is fabricated on the flexible substrate 410 with the flexibility, the flexible substrate 410 will not have cracks. Furthermore, since the flexible substrate 410 have no cracks, only the gate lines and the data lines in the impact area 590 are broken, but the gate lines and the data lines outside the impact area 590 are not broken.

Please refer to FIG. 5B again. Although the gate line in the impact area 590 is broken, some of the LED cells between the impact area 590 and the gate driver 420 on the left side of the impact area 590 can still receive the pulses from the gate driver 420 and the display data from the source drivers 430 and 530. In other words, some of the LED cells between the impact area 590 and the gate driver 420 on the left side of the impact area 590 can be operated normally. Similarly, some of the LED cells between the impact area 590 and the gate driver 520 on the right side of the impact area 590 can still receive the pulses from the gate driver 520 and the display data from the source drivers 430 and 530. In other words, some of the LED cells between the impact area 590 and the gate driver 420 on the right side of the impact area 590 can be operated normally.

Although the data line in the impact area 590 is broken, some of the LED cells between the impact area 590 and the source driver 430 on the lower side of the impact area 590 can still receive the pulses from the gate drivers 420 and 520 and the display data from the source driver 430. In other words, some of the LED cells between the impact area 590 and the source driver 430 on the lower side of the impact area 590 can be operated normally. Similarly, some of the LED cells between the impact area 590 and the source driver 530 on the upper side of the impact area 590 can still receive the pulses from the gate drivers 420 and 520 and the display data from the source driver 530. In other words, some of the LED cells between the impact area 590 and the source driver 530 on the upper side of the impact area 590 can be operated normally.

During the operations of the micro LED displaying apparatus, the gate drivers 420, 520 and the source drivers 430, 530 are all in operation. Consequently, the power consumption maybe higher.

Figure 6:
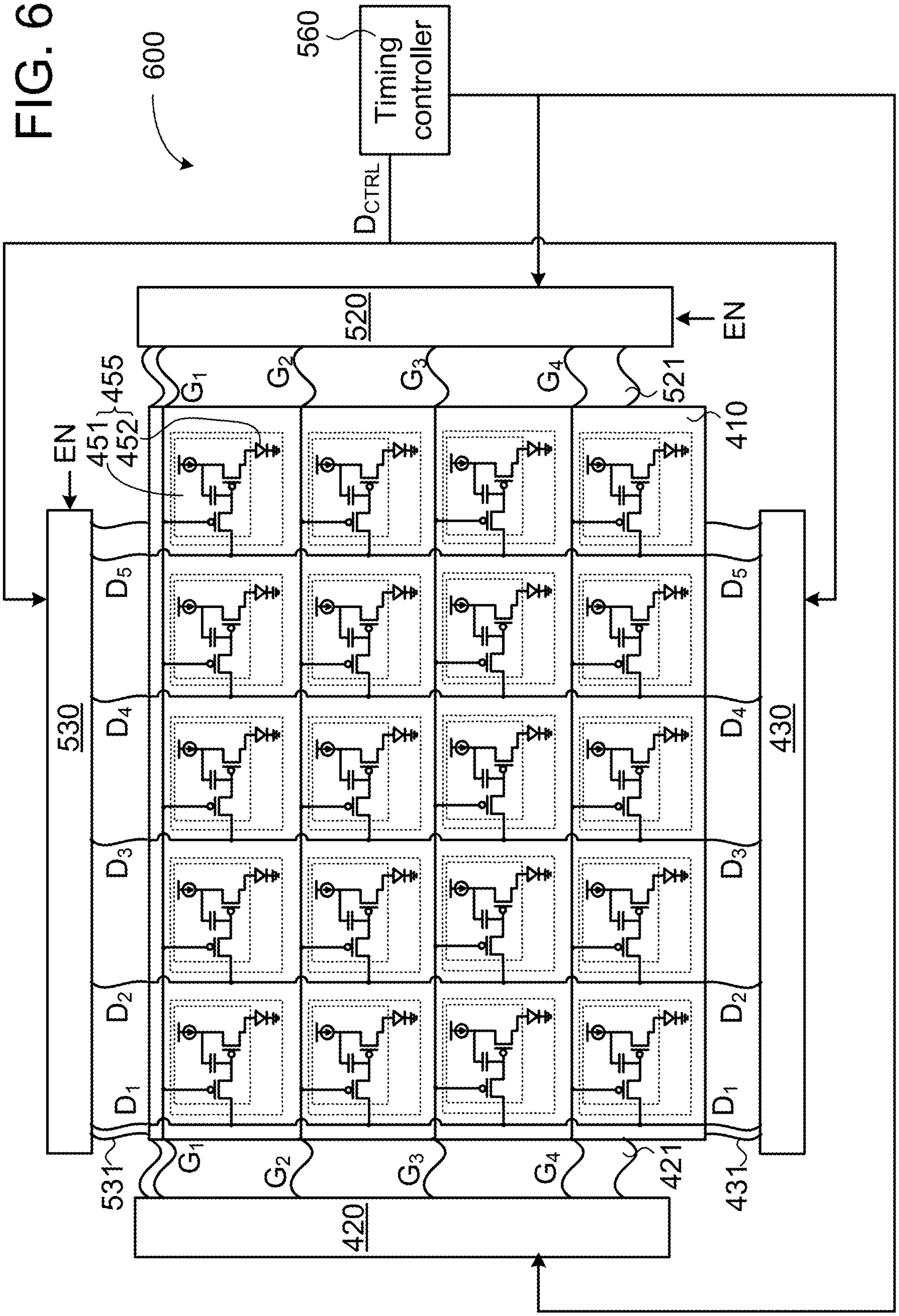
FIG. 6 is a schematic circuit diagram of a micro LED displaying apparatus according to a third embodiment of the present invention.

FIG. 6 is a schematic circuit diagram of a micro LED displaying apparatus according to a third embodiment of the present invention. In comparison with the micro LED displaying apparatus 500 of the second embodiment, each of the gate driver 520 and the source driver 530 in the micro LED displaying apparatus 600 of this embodiment further receives an enable signal EN.

When the micro LED displaying apparatus 600 is operated normally, the enable signal EN is inactivated, and the gate driver 520 and the source driver 530 are disabled. Meanwhile, in the LED cell array, the gate lines $G_1$~$G_4$ receive the pulses from the gate driver 420 only, and the data lines $D_1$~$D_5$ receive the display data from the source driver 430 only.

In this embodiment, the enable signal EN is activated only when the micro LED displaying apparatus 600 detects that the micro LED panel is damaged by external forces. That is, when the enable signal EN is activated, the gate driver 520 and the source driver 530 are enabled.

Meanwhile, in the LED cell array, the first terminals of the gate lines $G_1$~$G_4$ receive the pulses from the gate driver 420, the second terminals of the gate lines $G_1$~$G_4$ receive the pulses from the gate driver 520, the first terminals of the data lines $G_1$~$G_4$ receive the display data from the source driver 430, and the second terminals of the data lines $G_1$~$G_4$ receive the display data from the gate driver 530. The operations of the micro LED displaying apparatus 600 of this embodiment are similar to those of the second embodiment, and not redundantly described herein.

From the above descriptions, the present invention provides a micro LED displaying apparatus. When the micro LED panel in each of the micro LED displaying apparatus 500 of the second embodiment and the micro LED displaying apparatus 600 of the third embodiment is damaged by external forces, only the LED cells in the impact area 590 cannot be operated normally, but the other LED cells can still be operated normally. That is, even if the micro LED displaying apparatus 500 or the micro LED displaying apparatus 600 is damaged by external forces, a large area of the micro LED displaying apparatus can still display images normally. Consequently, the micro LED displaying apparatus of the present invention is suitable for specified fields with strict verification standards.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A micro LED displaying apparatus, comprising:

a flexible substrate;

an LED cell array fabricated on the flexible substrate, wherein the flexible substrate and the LED cell array are collaboratively formed as a micro LED panel of the micro LED displaying apparatus, the LED cell array is composed of M×N LED cells, the LED cell array is connected to M gate lines and N data lines, and M and N are positive integers, wherein first terminals of the N LED cells in a first row of the LED cell array are connected to a first gate line of the M gate lines, and second terminals of the N LED cells in the first row of the LED cell array are respectively connected to the N data lines;

a first gate driver connected to first terminals of the M gate lines;

a second gate driver connected to second terminals of the M gate lines;

a first source driver connected to first terminals of the N data lines;

a second source driver connected to second terminals of the N data lines; and a timing controller connected to the first gate driver, the second gate driver, the first source driver and the second source driver, wherein the first gate driver and the second gate driver simultaneously and respectively generate a first pulse and a second pulse, and the first source driver and the second source driver simultaneously and respectively generate a first display data and a second display data, wherein the first pulse from the first gate driver is transmitted to a first terminal of the first gate line, the second pulse from the second gate driver is transmitted to a second terminal of the first gate line, the first display data from the first source driver is transmitted to a first terminal of a first data line of the N data lines, and the second display data from the second source driver is transmitted to a second terminal of the first data line, wherein the first display data and the second display data are identical, wherein when an impact area is formed on the micro LED panel and at least one LED cell in the impact area is damaged, first portions of the LED cells between the impact area and the first gate driver receive pulses from the first gate driver and receive display data from the first source driver and the second source driver and second portions of the LED cells between the impact area and the second gate driver receive pulses from the second gate driver and receive display data from the first source driver and the second source driver.

2. The micro LED displaying apparatus as claimed in claim 1, wherein the timing controller generates a gate control signal to the first gate driver and the second gate driver, and the timing controller generates a data control signal to the first source driver and the second source gate driver, wherein the first gate driver and the second gate driver simultaneously and respectively generate the first pulse and the second pulse according to the gate control signal, and the first source driver and the second source driver simultaneously and respectively generate the first display data and the second display data according to the data control signal.

3. The micro LED displaying apparatus as claimed in claim 2, wherein the first gate driver is connected to the first terminals of the M gate lines through a first flexible flat cable, the second gate driver is connected to the second terminals of the M gate lines through a second flexible flat cable, the first source driver is connected to the first terminals of the N data lines through a third flexible flat cable, and the second source driver is connected to the second terminals of the N data lines through a fourth flexible flat cable.

4. The micro LED displaying apparatus as claimed in claim 1, wherein the LED cell array comprises a first LED cell, and the first LED cell comprises:

a driving stage, wherein a control terminal of the driving stage is connected to the first gate line, and a data terminal of the driving stage is connected to the first data line; and a light emitting diode, wherein an anode of the light emitting diode is connected to an output terminal of the driving stage, and a cathode of the light emitting diode receives a ground voltage.

5. The micro LED displaying apparatus as claimed in claim 1, wherein third portions of the LED cells between the impact area and the first source driver receive pulses from the first gate driver and the second gate driver and receive display data from the first source driver, and fourth portions of the LED cells between the impact area and the second source driver receive pulses from the first gate driver and the second gate driver and receive display data from the second source driver.

6. A micro LED displaying apparatus, comprising:

a flexible substrate;

an LED cell array fabricated on the flexible substrate, wherein the flexible substrate and the LED cell array are collaboratively formed as a micro LED panel of the micro LED displaying apparatus, the LED cell array is composed of M×N LED cells, the LED cell array is connected to M gate lines and N data lines, and M and N are positive integers, wherein first terminals of the N LED cells in a first row of the LED cell array are connected to a first gate line of the M gate lines, and second terminals of the N LED cells in the first row of the LED cell array are respectively connected to the N data lines;

a first gate driver connected to first terminals of the M gate lines;

a second gate driver connected to second terminals of the M gate lines;

a first source driver connected to first terminals of the N data lines;

a second source driver connected to second terminals of the N data lines; and a timing controller connected to the first gate driver, the second gate driver, the first source driver and the second source driver, configured for generating a gate control signal to the first gate driver and the second gate driver, and generating a data control signal to the first source driver and the second source driver, wherein the second gate driver and the second source driver receive an enable signal, wherein when the enable signal is inactivated, the second gate driver and the second source driver are disabled, a first pulse from the first gate driver is transmitted to a first terminal of the first gate line, and a first display data from the first source driver is transmitted to a first terminal of a first data line of the N data lines, wherein the enable signal is activated, and the second gate driver and the second source driver are enabled when an Impact area is formed on the micro LED panel, and some LED cells in the impact area are damaged.

7. The micro LED displaying apparatus as claimed in claim 6, wherein the first gate driver is connected to the first terminals of the M gate lines through a first flexible flat cable, the second gate driver is connected to the second terminals of the M gate lines through a second flexible flat cable, the first source driver is connected to the first terminals of the N data lines through a third flexible flat cable, and the second source driver is connected to the second terminals of the N data lines through a fourth flexible flat cable.

8. The micro LED displaying apparatus as claimed in claim 6, wherein the LED cell array comprises a first LED cell, and the first LED cell comprises:

a driving stage, wherein a control terminal of the driving stage is connected to the first gate line, and a data terminal of the driving stage is connected to the first data line; and a light emitting diode, wherein an anode of the light emitting diode is connected to an output terminal of the driving stage, and a cathode of the light emitting diode receives a ground voltage.

9. The micro LED displaying apparatus as claimed in claim 6, wherein the first gate driver and the second gate driver simultaneously and respectively generate the first pulse and a second pulse according to the gate control signal, and the first source driver and the second source driver simultaneously and respectively generate the first display data and a second display data according to the data control signal.

10. The micro LED displaying apparatus as claimed in claim 9, wherein the first pulse from the first gate driver is transmitted to a first terminal of the first gate line, the second pulse from the second gate driver is transmitted to a second terminal of the first gate line, the first display data from the first source driver is transmitted to a first terminal of a first data line of the N data lines, and the second display data from the second source driver is transmitted to a second terminal of the first data line, wherein the first display data and the second display data are identical.

11. The micro LED displaying apparatus as claimed in claim 6, wherein first portions of the LED cells between the impact area and the first gate driver receive pulses from the first gate driver and receive display data from the first source driver and the second source driver, and second portions of the LED cells between the impact area and the second gate driver receive pulses from the second gate driver and receive display data from the first source driver and the second source driver.

12. The micro LED displaying apparatus as claimed in claim 11, wherein third portions of the LED cells between the impact area and the first source driver receive pulses from the first gate driver and the second gate driver and receive display data from the first source driver, and fourth portions of the LED cells between the impact area and the second source driver receive pulses from the first gate driver and the second gate driver and receive display data from the second source driver.

* * * * *